Patented Nov. 6, 1934

1,979,387

UNITED STATES PATENT OFFICE 1,979,387

CASH REGISTER

Hans Fredrik Birger Högfors, Stockholm, Sweden, assignor to Kooperativa Förbundet Förening U. P. A., Stockholm, Sweden Application April 24, 1931, Serial No. 532,648
In Sweden June 2, 1930

8 Claims. (Cl. 235—7)

The present invention relates to a device in cash registers and calculating machines for simultaneous engagement of the totalizer and the member or members which are to show the amount registered at each operation. The device consists therein that the totalizer is supported by its shaft in a sledge or guide at one side of a pair of racks forming registering racks and amount indicator racks which are set according to the different numerals, while on an extension of the sledge at the other side of the racks is located a second sledge carrying a toothed wheel corresponding to each pair of racks, the two sledges being connected positively to each other in such a way that when one sledge is actuated they move toward each other and away from each other respectively, and in such a way that simultaneously with the totalizer being engaged the toothed wheel is brought into engagement with teeth on the corresponding side of the pair of racks, and thus the amount indicator racks will always accompany the registering racks on their returning to the zero position the same number of divisions as the totalizer, and thus the amount indicator wheels will never be able to show another amount than the one which has been registered in the totalizer.

Figure 1:
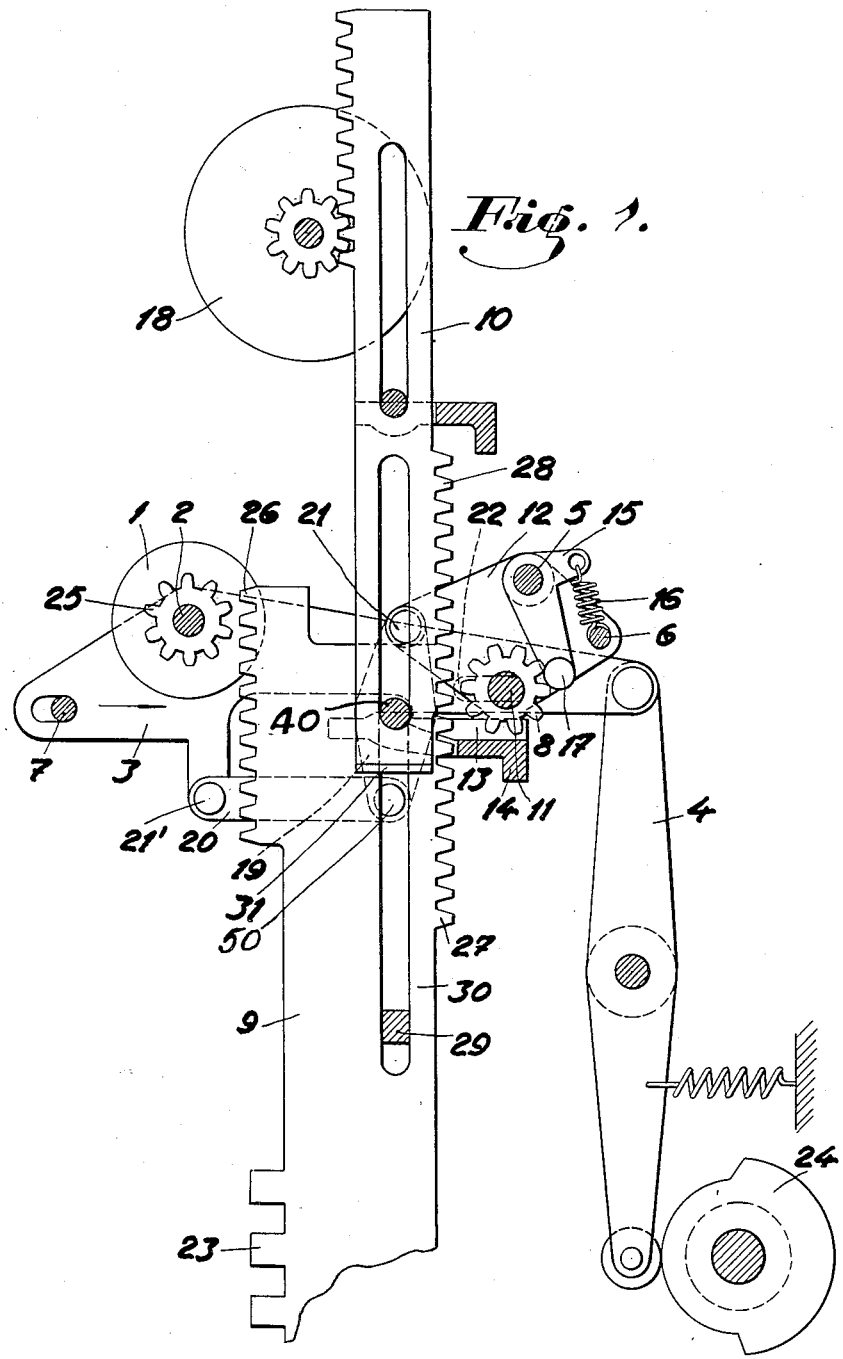
Figure 2:
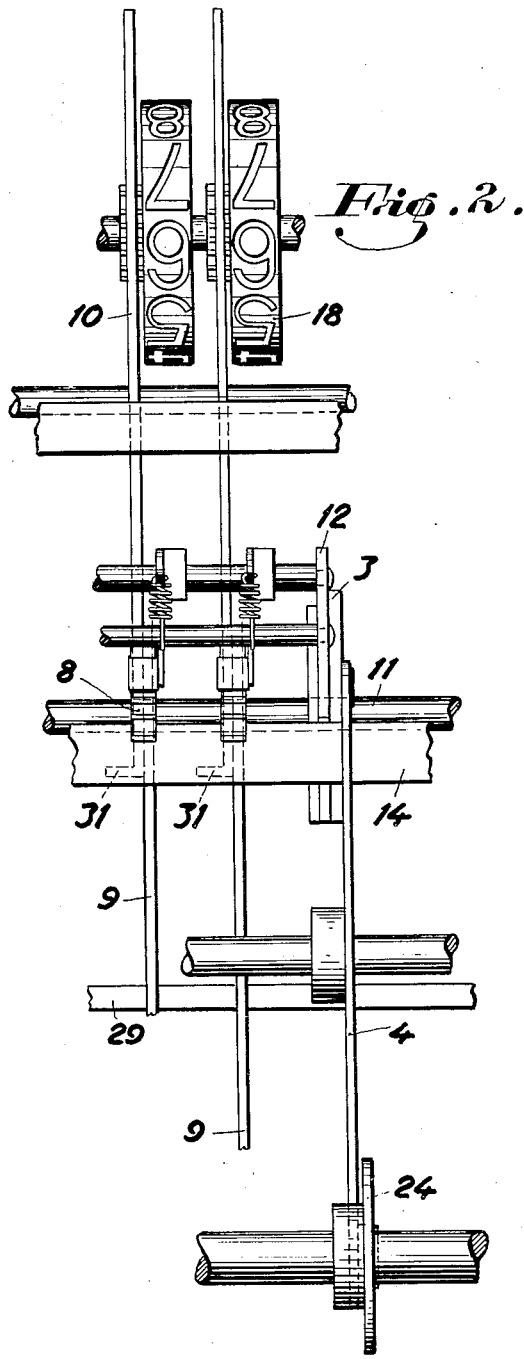

An embodiment of the invention is illustrated in the accompanying drawings in which Figure 1 is a section at right angles to the shaft of the totalizer;

Fig. 2 is a fragmentary rear view of the mechanism shown in Fig. 1.

As is clear from Figures 1 and 2, the numeral wheels 1 of the totalizer are supported by a shaft 2 which, in its turn, is supported by two sledges 3 (only one sledge is shown) which are pivotally supported at one end by means of levers 4. These sledges and the shaft 2 form a carriage. A guide rod 7 extends through openings in the other ends of the sledges. The carriage formed by the sledges glides on rod 7 when being engaged or disengaged. The toothed wheels 8 serving to connect the registering racks 9 and the amount indicator racks 10 are adapted to be turned about a shaft 11 which is supported in a second carriage formed by the end plates 12. The toothed wheels 8 are guided in a suitable manner axially as well as radially in relation to the shaft 11, for instance in such a way that they are axially held in position by running in grooves 13 in a guide bar 14, and radially held by locking arms 15 which with their one end 17, for instance by springs 16, are forced to fall in between two teeth of the wheel 8. The amount indicator racks 10 are in a known way connected to the amount indicator wheels 18 by means of tooth wheels.

The end plates 12 are connected by means of pins 21 to rocking arms 19 pivoted on shaft 40. The other ends of arms 19 are connected by pins 50 to links 20 which, in turn, are connected by pins 21' to sledges 3. Thus, when the sledges 3 move in the direction of the arrow (Figure 1), the toothed wheels 8 move in the opposite direction, whereby the shaft 11 runs in oblong holes 22 in the sledges 3, said holes corresponding to the shaft. British patent to Brewer, No. 244,601, of December 24, 1925, discloses a mechanism including racks constructed similarly to racks 9 described herein. The racks 9 of the present invention are operated similarly to the corresponding racks shown in this British patent. Rack 9 is actuated in a manner similar to the actuation of sectors 39 shown and described in the Martin patent, No. 1,181,238. The rod 29 associated with applicant's rack 9 is actuated by a cam like the rod 42 of Martin is actuated by cam 50.

British patent, No. 270,350, under the heading "Differential mechanism" appearing in line 118 of page 2 to line 85 of page 3, describes a mechanism for actuating the rack sectors corresponding to that employed to actuate racks 9 and the rod 29.

Also British patent, No. 285,500, under the heading "Differential mechanism" appearing in lines 57–124 of page 6, describes a corresponding mechanism.

Thus, as in the description of the three above-mentioned patents, means (not shown) are provided for moving rack 9 upwardly until the projection 23 strikes against a projection (not shown), which is placed in the upward path of movement of projection 23 by the depression of one of the usual keys associated with the register or calculating machine. Simultaneously with the upward movement of rack 9, the rod 29 also moves upwardly in slot 30. Even after the rack 9 has been stopped in its upward movement, the rod 29 continues to move upwardly. Rod 29, during its upward movement, engages the lower portion 31 of rack 10 and moves the rack 10 up to its zero position.

After rack 9 has been stopped at the desired setting and rack 10 has moved to zero position, arms 4 are actuated by cam 24 to move the carriage formed by sledges 3 in order to engage pinions 25 of the totalizer wheels with rack teeth 26. Hereby the second carriage, formed by plates 12, at the same time is moved in the opposite direction of the carriage formed by sledges 3, and thus the pinions 8 are brought into engagement with teeth 27 and 28 of racks 9 and 10, respectively. When, then, the registering rack 9 returns to the zero position, the toothed wheels 8 and 25 remain in engagement, whereby the numeral wheels 1, as well as the amount indicator wheels 18, are carried forward a distance corresponding to the registered numeral. When the registering rack has returned to the zero position, the toothed wheels 8 and 25 are disengaged by the cam disks 24.

While at each operation the totalizer adds the registered amounts to the sum already totalled in the totalizer, the amount indicators are only allowed to show the figures which have been registered at each operation. Thus the amount indicators must be returned to the zero position prior to each engagement of the totalizer and the registering racks. Indicator rack 10 is moved upwardly by means of the return rod 29 shown in Fig. 1. Return rod 29 is moved along slits 30 in the totalizer rack 9 by means of cam discs or the like. The return rod 29 is moved upwardly at the same time as the rack 9 is moved upwardly by its associated spring (not shown). If at the previous registration one of the racks 10 has been pulled down, its lower portion 31 is met by the rod 29 when the latter is moved upwards at the next registration whereby the rod 10 is returned to the zero position as is clear from Figure 1.

Having now described my invention, what I claim as new and desire to secure by Letters Patent is:

1. In cash registers and calculating machines having indicating and totalizing devices of the character described, the combination comprising a pair of straight sliding racks, one of said racks being an indicator rack and being operatively connected to an indicating wheel, the other of said pair of racks being a totalizer rack movable in accordance with values to be indicated, a carriage at one side of said pair of racks carrying a totalizer-actuating pinion, a second carriage mounted on the other side of said racks on an extension of the first carriage, a coupling pinion carried by the second carriage, means positively connecting said carriages together so that one carriage is moved in a direction opposite to the other, and means, operable prior to sliding of the totalizer rack to effect a registering, for shifting the carriages to engage the totalizer pinion with teeth on said totalizer rack and for engaging the coupling pinion with teeth on both of said racks to effect sliding of the indicator rack a distance corresponding to that of the totalizer rack.

2. A device as set forth in claim 1, in which the means for connecting said carriages consists of a rocker arm and a link.

3. In cash registers and calculating machines having indicating and totalizing devices of the character described, the combination comprising a pair of straight sliding racks, one of said racks being an indicator rack and being operatively connected to an indicating wheel, the other of said pair of racks being a totalizer rack movable in accordance with values to be indicated, a carriage formed of a pair of spaced horizontally slidable plates, a totalizer shaft mounted in said carriage and having a totalizer pinion adapted to engage with one side of said totalizer rack, a coupling pinion shaft positioned on the other side of the totalizer rack in horizontal slots formed in the plates of said carriage, a coupling pinion carried by the coupling pinion shaft, and means for simultaneously shifting the carriage to bring the totalizer pinion into engagement with the totalizer rack and shifting the coupling pinion shaft to bring the coupling pinion into engagement with both of said racks to transfer motion from the totalizer rack to the indicator rack.

4. In cash registers and calculating machines having indicating and totalizing devices of the character described, the combination comprising a pair of straight sliding racks, one of said racks being an indicator rack and being operatively connected to an indicating wheel, the other of said pair of racks being a totalizer rack movable in accordance with values to be indicated, a carriage formed of a pair of spaced horizontally slidable plates, a totalizer shaft mounted in said carriage and having a totalizer pinion adapted to engage with one side of said totalizer rack, a coupling pinion shaft positioned on the other side of the totalizer rack in horizontal slots formed in the plates of said carriage, a coupling pinion carried by the coupling pinion shaft, cam means for shifting said carriage to bring the totalizer pinion into engagement with said totalizer rack, and means including a rocker arm pivoted about a fixed axis and links connecting the rocker arm to said carriage and coupling pinion shaft to simultaneously shift the coupling pinion into engagement with both of said racks to transmit motion from the totalizer rack to the indicator rack.

5. In cash registers and calculating machines of the character described, having cooperating sliding totalizer and indicator racks, a carriage formed of a pair of spaced horizontally slidable plates, a totalizer shaft mounted in said carriage and having a totalizer pinion adapted to engage with one side of said totalizer rack, a coupling pinion shaft positioned on the other side of the totalizer rack in horizontal slots formed in the plates of said carriage, a coupling pinion carried by the coupling pinion shaft, and means for simultaneously shifting the carriage to bring the totalizer pinion into engagement with the totalizer rack and shifting the coupling pinion shaft to bring the coupling pinion into engagement with both of said racks to transfer motion from the totalizer rack to the indicator rack.

6. In cash registers and calculating machines of the character described, having cooperating sliding totalizer and indicator racks, a carriage formed of a pair of spaced horizontally slidable plates, a totalizer shaft mounted in said carriage and having a totalizer pinion adapted to engage with one side of said totalizer rack, a coupling pinion shaft positioned on the other side of the totalizer rack in horizontal slots formed in the plates of said carriage, a coupling pinion carried by the coupling pinion shaft, cam means for shifting said carriage to bring the totalizer pinion into engagement with said totalizer rack, and means including a rocker arm pivoted about a fixed axis and links connecting the rocker arm to said carriage and coupling pinion shaft to simultaneously shift the coupling pinion into engagement with both of said racks to transmit motion from the totalizer rack to the indicator rack.

7. In cash registers and calculating machines of the character described, having cooperating sliding totalizer and indicator racks, a carriage formed of a pair of spaced horizontally slidable plates, a totalizer shaft mounted in said carriage and having a totalizer pinion adapted to engage with one side of said totalizer rack, a coupling pinion shaft positioned on the other side of the totalizer rack in horizontal slots formed in the plates of said carriage, a coupling pinion carried by the coupling pinion shaft, a pair of spaced plates for supporting the coupling pinion shaft, said plates constituting a second carriage shiftable relative to the first carriage, and means for simultaneously shifting the first carriage to bring the totalizer pinion into engagement with the totalizer rack and shifting the second carriage to bring the coupling pinion into engagement with both of said racks to transfer motion from the totalizer rack to the indicator rack.

8. In cash registers and calculating machines of the character described, having cooperating sliding totalizer and indicator racks, a carriage formed of a pair of spaced horizontally slidable plates, a totalizer shaft mounted in said carriage and having a totalizer pinion adapted to engage with one side of said totalizer rack, a coupling pinion shaft positioned on the other side of the totalizer rack in horizontal slots formed in the plates of said carriage, a coupling pinion carried by the coupling pinion shaft, a pair of spaced plates for supporting the coupling pinion shaft, said plates constituting a second carriage shiftable relative to the first carriage, and means for simultaneously shifting the first carriage to bring the totalizer pinion into engagement with the totalizer rack and shifting the second carriage to bring the coupling pinion into engagement with both of said racks to transfer motion from the totalizer rack to the indicator rack, said last-recited means including a rocker pivoted about a fixed axis, having one end pivoted to said second carriage and the other end connected by a link to the first carriage.

HANS FREDRIK BIRGER HÖGFORS.